(12) United States Patent
Monks et al.

(10) Patent No.: US 7,761,645 B2
(45) Date of Patent: Jul. 20, 2010

(54) PHYSICAL DEVICE (PHY) SUPPORT OF THE USB2.0 LINK POWER MANAGEMENT ADDENDUM USING A ULPI PHY INTERFACE STANDARD

(75) Inventors: Morgan H. Monks, Tempe, AZ (US); David Haglan, Chandler, AZ (US)

(73) Assignee: Standard Microsystems Corporation, Hauppauge, NY (US)

( * ) Notice: Subject to any disclaimer, the term of this patent is extended or adjusted under 35 U.S.C. 154(b) by 91 days.

(21) Appl. No.: 12/141,445

(22) Filed: Jun. 18, 2008

(65) Prior Publication Data

US 2008/0320202 A1    Dec. 25, 2008

Related U.S. Application Data

(60) Provisional application No. 60/945,015, filed on Jun. 19, 2007.

(51) Int. Cl.
*G06F 13/38* (2006.01)
*G06F 13/20* (2006.01)
*G06F 13/36* (2006.01)

(52) U.S. Cl. .................................... 710/313
(58) Field of Classification Search .................. 710/313
See application file for complete search history.

(56) References Cited

U.S. PATENT DOCUMENTS

| | | | |
|---|---|---|---|
| 7,509,439 B2 * | 3/2009 | Monks et al. .................. 710/5 |
| 2006/0168364 A1 * | 7/2006 | Monks et al. ................. 710/15 |
| 2009/0070515 A1 * | 3/2009 | So et al. ...................... 710/311 |

OTHER PUBLICATIONS

"UTMI+ Low Pin Interface (ULPI) Specification—Revision 1.1"; ULPI.org Specifications; Oct. 20, 2004; all pages.*
"UTMI+ Low Pin Interface (ULPI) Specification—Revision 1.1"; ULPI.org Specifications; Oct. 20, 2004; 28 pages.
"USB 2.0 Link Power Management Addendum"; Engineering Change Notice; USB.org Specifications; Jul. 16, 2007; 29 pages.
International search report for application No. PCT/US2008/067536, mailed Sep. 26, 2008.

* cited by examiner

*Primary Examiner*—Ryan M Stiglic
(74) *Attorney, Agent, or Firm*—Meyertons Hood Kivlin Kowert & Goetzel, P.C.; Jeffrey C. Hood

(57) ABSTRACT

A protocol may enable support of the USB 2.0 LPM (Link Power Management) Addendum by a ULPI PHY (Universal Serial Bus Transceiver Macrocell Low-Pin Interface Physical Layer Device), facilitating transmitting the reserved PID (Physical Interface Device) token, used in the LPM Extended Transaction, through a ULPI bus. Bits [3:0] of a ULPI Tx Cmd (Transmit Command) byte may be reused, with the value of those bits being 4'b0 for a transmission (normally indicating a No PID transmission), by configuring the ULPI PHY to qualify the selected four Tx Cmd bits (bits [3:0] of the Tx Cmd) with the Opmode code. The ULPI PHY may thereby interpret bits [3:0] of the Tx Cmd byte based on the value of the Opmode, and may not transmit the Extended PID when the Opmode is set to 2'b10, that is, when the Opmode is indicative of bit-stuffing and NRZI encoding being disabled, for example during a Chirp transmission. When the Opmode code is set to 2'b0, indicative of normal bit-stuffing, and the Tx Cmd bits [3:0] are set to 4'b0 during a transmission (Tx Cmd bits[7:6]=2'b01), then the PHY may transmit the Extended PID, followed by the rest of the extended transaction onto a USB.

21 Claims, 4 Drawing Sheets

PHYSICAL DEVICE (PHY) SUPPORT OF THE USB2.0 LINK POWER MANAGEMENT ADDENDUM USING A ULPI PHY INTERFACE STANDARD

PRIORITY CLAIM

This application claims benefit of priority of provisional application Ser. No. 60/945,015 titled "Physical Device (PHY) Support of the USB 2.0 Link Power Management Addendum using a ULPI PHY interface standard" and filed Jun. 19, 2007, which is hereby incorporated by reference as though fully and completely set forth herein.

BACKGROUND OF THE INVENTION

1. Field of the Invention

The present invention relates generally to USB devices, and more specifically to ULPI physical devices which support the USB 2.0 Link Power Management Addendum.

2. Description of the Related Art

The Universal Serial Bus (USB) was developed to offer PC users an enhanced and easy-to-use interface for connecting an incredibly diverse range of peripherals to their computers. The development of the USB was initially driven by considerations for laptop computers, which greatly benefit from a small profile peripheral connector. Among the many benefits of the USB is a reduction in the proliferation of cables that can affect even the smallest computer installations. In general, USB has become the interface of choice for PCs because it offers users simple connectivity. USB eliminates the need to have different connectors for printers, keyboards, mice, and other peripherals, and supports a wide variety of data types, from slow mouse inputs to digitized audio and compressed video. In addition, USB devices are hot pluggable, i.e. they can be connected to or disconnected from a PC without requiring the PC to be powered off.

The USB specification has seen various revisions, with the USB 2.0 standard challenging the IEEE 1394 interface ("Firewire") as the interface of choice for high-speed digital video, among others. With the proliferating design of increasingly smarter, faster, and smaller peripherals, the On-The-Go (OTG) Supplement to the USB 2.0 Specification was developed to address the growing popularity of the portable electronic devices market. Some of the advantages of the USB and OTG include the built-in support in form of more than 1.4 billion USB enabled PCs and peripherals shipped worldwide, smooth and trouble-free experience for the user through a compliance and logo program operated by the USB-IF, a wide variety of USB solutions such as intellectual property (IP) blocks, system-on-chip (SOC) parts, discrete chips, software drivers and systems offered by a large group of industry vendors, and design flexibility based on system needs.

OTG devices typically do not require a PC host, and can communicate directly with each other. For example, a PDA may act as a USB host with the capability to print directly to a USB printer, while also acting as a USB peripheral to communicate with a PC. In general, designers are facing increasing pressure to design smaller and faster products in less time and at lower cost. Concurrently, the introduction of smaller deep sub-micron processes present new challenges, such as integrating the physical layer (PHY—transceiver) analog circuitry required by technologies such as USB and OTG, leading to increased man-hours, fiscal and time investment, and silicon revisions. One way to increase time-to-market while keeping costs low is to provide the PHY in a separate chip. In such a case the designer can typically integrate most of the USB digital logic into the application specific integrated circuit (ASIC) in a small amount of time, and connect to a proven external PHY already available on the market.

Following the release of the USB 2.0 specification, Intel released the USB 2.0 Transceiver Macrocell Interface (UTMI) specification. UTMI defined an interface between two IP blocks, the USB Transceiver Macrocell (IP) and the USB Link layer (SIE). For example, the UTMI can be used to interface between a USB Link and a USB PHY. The signals for a UTMI interface with an 8-bit bi-directional data bus. Typically a minimum of 22 signals is required between the Link and the PHY for a device.

Subsequently, an extension of the original UTMI specification the UTMI+ specification was developed to meet the emerging need of building embedded host and OTG capabilities into USB devices. While the original UTMI specified an interface not meant to couple discrete ICs, the UTMI+ in essence introduced host and On-The-Go capabilities to USB systems. Using UTMI as a starting point, UTMI+ incrementally adds new functionality and interface signals to the Link and PHY. The additional signals total 33 for a full OTG UTMI+ interface. Designers can reuse all blocks from their original UTMI IP, and need only add the new circuits required for host or OTG support. This approach works well for UTMI+, as USB peripherals need only a subset of host and OTG functionality. UTMI+ introduced four levels of functionality, each higher level increasing the complexity required in both hardware and software while remaining completely backward compatible with lower levels.

A Low Pin Interface (LPI) UTMI+ specification, referred to as ULPI, was developed by USB industry leaders in order to provide low-cost USB and OTG PHYs by way of a low-pin, low-cost, small form-factor transceiver interface that may be used by any USB application. Pre-existing specifications, including UTMI and UTMI+ were developed primarily for Macrocell development, and were thus not optimized for use as an external PHY. Building upon the existing UTMI+ specification, the ULPI reduces the number of interface signals to 12 pins, with an optional implementation of 8 pins. As a result, the package size of PHY and Link IC's has generally been reduced, not only lowering the cost of Link and PHY IC's, but also reducing the required size of the associated printed circuit boards (PCBs). Central to the ULPI specification is the LPI, which is in effect a generic bus that defines a clock, three control signals, a bi-directional data bus, and bus arbitration. Typically, a ULPI link will configure the ULPI PHY using register writes on a bi-directional shared data bus. The ULPI PHY is the arbitrator of the 8-bit data bus between the link and the PHY.

Present day USB devices that may all communicate with a host computer system over USB include USB printers, scanners, digital cameras, storage devices, card readers, etc. USB based systems may require that a USB host controller be present in the host system, and that the operating system (OS) of the host system support USB and USB Mass Storage Class Devices. USB devices may communicate over the USB bus at low-speed (LS), full-speed (FS), or high-speed (HS). A connection between the USB device and the host may be established via digital interconnect such as Interchip USB, ULPI, UTMI, etc., (as described above) or via a four wire interface that includes a power line, a ground line, and a pair of data lines D+ and D−. When a USB device connects to the host, the USB device may first pull a D+ line high (the D− line if the device is a low speed device) using a pull up resistor on the D+ line. The host may respond by resetting the USB device. If the USB device is a high-speed USB device, the USB device may "chirp" by driving the D− line high during the reset. The host may respond to the "chirp" by alternately driving the D+ and D− lines high. The USB device may then electronically remove the pull up resistor and continue communicating at high speed. When disconnecting, full-speed devices may remove the pull up resistor from the D+ line (i.e., "tri-state" the line), while high-speed USB devices may tri-state both the D+ and D− lines.

A recent addition to the continuing development of the USB specification has been the USB 2.0 Link Power Management (LPM) Addendum, which is a new method to reduce the power demands of low bandwidth peripherals when connected to a portable device using the USB 2.0 specification. In general, the LPM ECN (Engineering Change Notice) adds a new power state (a power sleep state) between the existing enabled and suspended states. A USB Device in power sleep state is not required to reduce its power consumption. However, switching between the enabled state and sleep state is much faster than switching between the enabled state and suspended state, allowing devices to sleep while in idle mode. To reduce the configured current that the HOST is required to source on the USB Vbus connector, the LPM implements an Extended Transaction to suspend the peripheral faster than what would be possible under a standard USB 2.0 configuration.

The LPM Extended Transaction uses the he remaining USB 2.0 reserved PID (Physical Interface Device) value (4'b0), which is in the Special PID type group, to create a new Extension Token transaction (EXT PID). This EXT PID ("extended token 4'b0") is not supported by ULPI PHYs, however, since the reserved PID value 4'b0 is used in the ULPI Chirp transaction. Hence, there is currently no PHY support for USB 2.0 LPM using the ULPI PHY interface standard. In other words, USB devices which have PHY and LINK portions that interface using ULPI cannot take advantage of the power saving features of the LPM Addendum, because the reserved PID value used for the LPM Extended Transaction is already used for other purposes in ULPI.

Other corresponding issues related to the prior art will become apparent to one skilled in the art after comparing such prior art with the present invention as described herein.

SUMMARY OF THE INVENTION

In one set of embodiments, a USB device, which comprises PHY and LINK portions that interface using a ULPI, is able to take advantage of the power saving features of the LPM Addendum. An exemplary system may comprise a first bus (which may be a standard ULPI—Universal Serial Bus Transceiver Macrocell Low-Pin Interface —bus) and a second bus (which may be a USB), a transmitter/receiver, commonly referred to as a transceiver, (which may be a USB Link) coupled to the first bus, and a device (which may be a ULPI PHY—ULPI Physical Layer Device—coupled to the first bus and the second bus. The transceiver (transmitter/receiver) may be configured to initiate a data transfer to the device by transmitting onto the first bus a first code (which may be comprised in a ULPI transmit command byte) indicative of a data transmission and further indicative of data to be transmitted not having a physical interface device (PID) code. The transceiver (transmitter/receiver) may further be configured to transmit onto the first bus, as part of the data transfer, a reserved PID code (which may be an extended PID token of a Link Power Management—LPM—Extension Token Transaction) and corresponding one or more packets (which may be ULPI—Universal Serial Bus Transceiver Macrocell Low-Pin Interface—extended transaction packets) subsequent to transmitting the first code. The device may be configured to receive the first code and the reserved PID code and corresponding one or more packets, and qualify the first code with a function control code (which may be a ULPI operation mode—OpMode—code). When the function control code is indicative of normal operation, the device may transmit the reserved PID code and corresponding one or more packets onto the second bus.

In one set of embodiments, a USB (Universal Serial Bus) Link may comprise a ULPI I/O (ULPI Input/Output) interface configured to enable the USB Link to transmit and/or receive information (which may comprise data packets of USB transactions) over a ULPI bus. The USB Link may further include a USB Link protocol logic configured to initiate data transfer on the ULPI bus by transmitting through the ULPI I/O interface a first code indicative of a data transmission and further indicative of data to be transmitted not having a physical interface device (PID) code. The USB Link protocol logic may further be configured to transmit onto the ULPI bus through the ULPI I/O interface, as part of the initiated data transfer, a reserved PID code (indicative of a request for a target device of the initiated data transfer to transition to a different state) and corresponding one or more packets subsequent to transmitting the first code. The USB Link may further comprise one or more buffers configured to store information outgoing and incoming through the ULPI I/O interface.

In one set of embodiments, a ULPI PHY may comprise ULPI interface control logic configured to enable the ULPI PHY to transmit and/or receive information over a ULPI bus, and a function control register configured to store information indicative of the modes of operation of the USB PHY. The ULPI PHY may be configured to receive over the ULPI interface a first code indicative of a data transmission and further indicative of data to be transmitted not having a physical interface device (PID) code. The ULPI PHY may further be configured to receive a reserved PID code and corresponding one or more packets subsequent to receiving the first code, and transmit the reserved PID code and corresponding one or more packets onto a USB, when contents of the function control register are indicative of normal mode of operation. The ULPI PHY may also include transceiver (transmitter/receiver) logic configured to interface with the USB and to at least partially manage transmitting and receiving packets of the USB PHY over the USB.

A method for transmitting an extended transaction may include initiating a data transfer, including transmitting onto a first bus a first code indicative of a data transmission and further indicative of data to be transmitted not having a physical interface device (PID) code. The method may further include transmitting onto the first bus, as part of the data transfer, a reserved PID code and corresponding one or more packets, subsequent to transmitting the first code. As part of the method, the first code and the reserved PID code and corresponding one or more packets may be received, and the first code may be qualified with a function control code. When the function control code is indicative of normal operation, the reserved PID code and corresponding one or more packets may be transmitted onto a second bus. In one embodiment, transmitting the first code comprises transmitting a ULPI transmit command byte indicative of a No PID data transmission, transmitting onto the first bus the reserved PID code comprises transmitting an LPM Extended PID token, and transmitting the corresponding one or more packets comprises transmitting at least an LPM token packet and extended token packet.

In one set of embodiments, a system may comprise a USB Link and a USB PHY. The USB Link may be configured to initiate data transfer on a ULPI bus by transmitting a first code indicative of a data transmission and further indicative of data to be transmitted not having a PID code (in one embodiment the first code may be a Tx Cmd No PID code), and also transmit onto the ULPI bus, as part of the data transfer, a reserved PID code (which may be an LPM extended PID token) and corresponding one or more packets subsequent to transmitting the first code. The ULPI PHY may be configured to store a function control code, receive the first code, receive the reserved PID code and corresponding one or more packets subsequent to receiving the first code, and transmit the reserved PID code and corresponding one or more packets onto a USB, when the control function code is indicative of a normal mode of operation. The USB Link may be comprised on a system-on-chip (SOC), and the ULPI PHY may be configured on the SOC or external to the SOC. In various embodiments, the USB Link and ULPI PHY may be comprised in a USB Host device, a USB on-the-go (OTG) device, a USB hub, and/or a computer system, just to name a few possibilities.

BRIEF DESCRIPTION OF THE DRAWINGS

A better understanding of the present invention may be obtained when the following detailed description is considered in conjunction with the following drawings, in which.

Figure 1:
FIG. 1 shows one possible USB coupled system that may be implemented using embodiments of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (e.g., having the potential to or being able to in some embodiments), not a mandatory sense (i.e., must). The term "include", and derivations thereof, mean "including, but not limited to". The term "coupled" means "directly or indirectly connected".

DETAILED DESCRIPTION OF THE PREFERRED EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network and/or other physical transmission medium, that conveys signals such as electrical, electromagnetic, or digital signals.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Binary Numbers—when referencing numbers, a leading 'b' in front of a numeric sequence indicates that a binary number follows. For example, 'b10' may refer to a 2-bit binary number, the MSB (most significant bit) of which is '1'. A number preceding the letter 'b' and separated by an apostrophe indicates the number of bits in the binary number that follows. For example, "8'b0" may refer to an 8-bit binary number with all eight bits being '0'. Similarly, "8'b10xx_xxxx" may refer to a binary number whose upper two bits comprise '10', with each one of the remaining bits comprising either a '1' or a '0'.

FIG. 1 illustrates one embodiment of an exemplary USB system. As shown, the USB device 100 may be coupled to host device 140, e.g., via a USB hub 120. Note that in some embodiments one or more of the elements shown in FIGS. 1-3 may be omitted, e.g., the host device 140 and/or the USB hub 120, among others. For example, the USB device 100 may be coupled directly to the host device 140, e.g., without the USB hub 120 (e.g., for low-power enumeration, described below). Note that the above-described connections/configurations are exemplary only and other configurations are envisioned.

The USB device 100 may be any of numerous devices. For example, the USB device 100 may be a cell phone (e.g., cell phone 200 illustrated in FIG. 2), a personal music player (e.g., player 300 illustrated in FIG. 3, e.g., an mp3 player, and/or an IPOD™, among other players, a CD player, etc.), a personal video player (e.g., the player 300 illustrated in FIG. 3, e.g., a digital video player, a DVD player, etc.), a peripheral device (e.g., a printer), an input device (e.g., a game controller, touchpad, mouse, and/or keyboard, among others), or any other device that requires battery charging. Thus, the USB device 100 may be any of a variety of appropriate devices.

Figure 2:
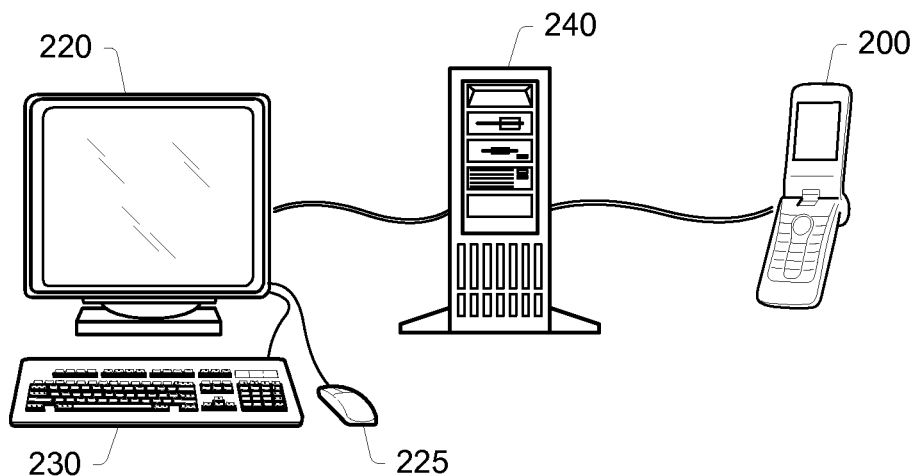
FIG. 2 shows on possible computer system that may be implemented using embodiments of the present invention.
Figure 3:
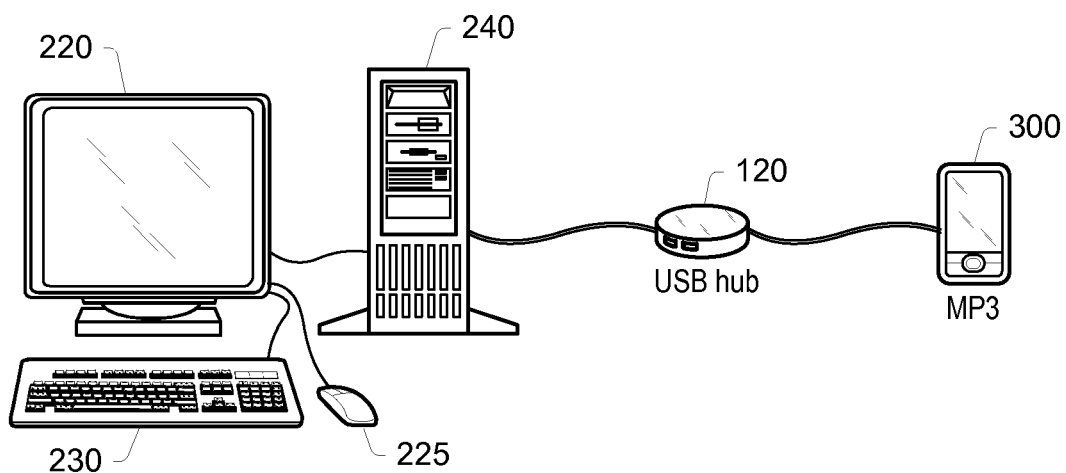
FIG. 3 shows another possible computer system that may be implemented using embodiments of the present invention.

Additionally, the host device 140 may be any of various host devices; more specifically, the host device 140 may be a computer system, e.g., such as computer system 240 illustrated in FIGS. 2 and 3, a USB hub, e.g., an external USB hub or one included in an electronic system (e.g., the computer system 240 or display device 220, among others), and/or other types of host devices, e.g., ones that provide power for charging the USB device 100. Alternatively, or additionally, the host device 140 may be a second USB device, e.g., similar to the USB device 100, among others. For example, in one embodiment, the second USB device may be a USB on-the-go (OTG) device which may be operable to act as a host and a device, e.g., depending on the situation. Thus, according to various embodiments the host device 140 may be any of various appropriate devices.

As shown in FIGS. 2 and 3, the computer system 240 may include/couple to the display device 220 operable to display video signals received from the computer system 240 and/or to act as a USB hub. In other words, the display device 220 may act as the USB hub 120 as well as displaying video signals from the host device 140 (e.g., the computer system 240). Additionally, the computer system 240 may include keyboard 230 and mouse 225 which may be USB device. Keyboard 230 and mouse 225 may couple to the computer system 240 in a variety of ways, e.g., directly to the computer 240 or via the USB hub included in the display device 220, among other methods. Thus, in FIGS. 2 and 3, the keyboard 230 and mouse 225 are shown coupled to the display 220, which may act as a USB hub. Alternatively, the keyboard 220 and mouse 225 may be coupled to the computer system 240, e.g., a hub in the computer system 240.

Additionally, the computer system 220 may include at least one memory medium on which one or more computer programs or software components may be stored. For example, the memory medium may store operating system software, as well as other software for operation of the computer system 240. Various embodiments further include receiving or storing instructions and/or data implemented in accordance with the foregoing description upon a carrier medium. Note that the above descriptions of the host device 140, the USB device 100, the computer system 240 (and components therein, e.g., input devices), and the display device 220 are exemplary only and other components and systems are envisioned.

As shown in FIG. 2, the cell phone 200 (e.g., the USB device 100) may couple to the computer system 240 (e.g., the host device 140). More specifically, in some embodiments, the USB device 100, e.g., the cell phone 200, may couple to a hub included in the computer system 240. Thus, in some embodiments, the USB device 100 may couple directly to a USB port included in the computer system 240. However, as noted above (and shown in FIG. 3), the USB device 100 may couple indirectly, e.g., through USB hub 120 or other devices.

In the example shown in FIG. 3, the player 300 may be coupled to the USB hub 120 which may in turn be coupled to the computer system 240. Alternatively, in some embodiments, the configuration may be different; for example, as indicated above, the display device 220 and/or the computer system 240 may include a USB hub (e.g., passively or actively powered). Correspondingly, in one embodiment, the USB device 100 may couple to the display device 220 which may in turn provide power to the USB device 100. The display device 200 may also provide USB communication between the USB device 100 and the computer system 240 (e.g., the host device 140). Thus, FIGS. 1-3 illustrate exemplary systems in which connection between a USB device and a host/hub may be established via a USB, where the host/hub may include a USB Link coupled to a USB PHY via a ULPI bus, and implement transmission of the reserved PID used in the Link Power Management Extended Transaction through the ULPI bus.

Various embodiments of the present invention provide for USB connectivity with reduced power consumption. As set forth in the LPM Addendum, the L1 (Sleep) LPM state differs from the L2 (USB 2.0 Suspend) state in two ways. The transitional latencies into and out of the sleep state are much shorter than into and out of the L2 suspend state, and there are no explicit power draw requirements on the attached device (L2 requires a suspended device to reduce its power draw from the Vbus). A device whose upstream port is in L1 (Sleep mode) typically doesn't monitor bus activity, and is generally configured to conserve power whenever possible. The host provides an indication to the device on the minimum time it will be driving resume if the host initiates exit form L1 (Sleep state). The indicator is set by the host based on its current workload policies and is typically in the range of 50 to 1200 µs. The L1 LPM state supplements the L2 USB 2.0 state by utilizing most of the existing suspend/resume infrastructure (signaling levels, line states while in the state, etc.) but, provides much faster transitional latencies between L1 and L0 (On State). A host will also not initiate an action that results in the transmittal of an LPM transaction to a device unless the addressed device is connected directly to a downstream port from the host or hub. The host will further not initiate a command to issue an LPM transaction to a host or hub port when a split transaction to the addressed device is in progress.

Figure 4:
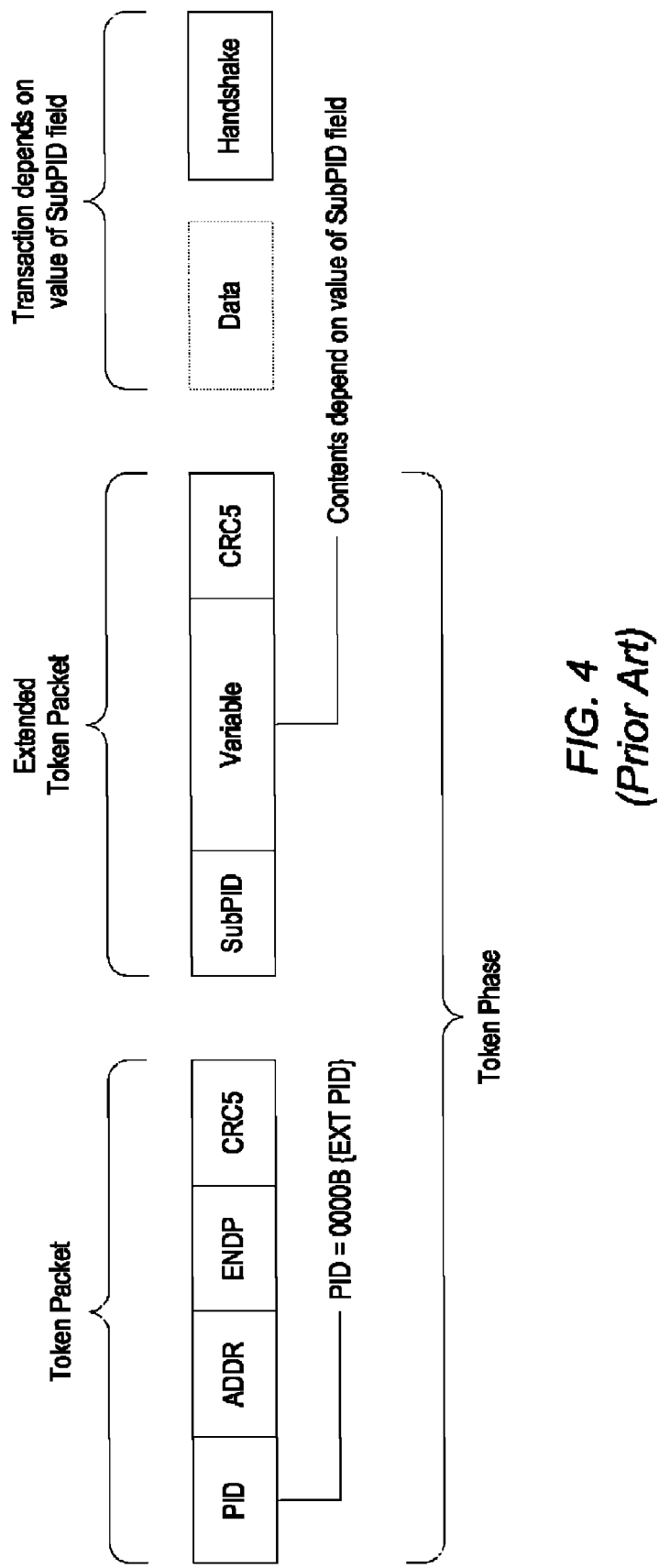
FIG. 4 shows a packet diagram of a Link Power Management Extended Token transmission according to prior art.

The LPM protocol uses a transaction to request a device connected to a port to transition to L1 (Sleep mode). The USB 2.0 specification has provision for one 'reserved' PID (Physical Interface Device) value. Thus, the LPM Addendum defines an extension transaction to allow future extension of the protocol. The extension transaction uses the remaining USB 2.0 reserved PID value (0000B), which is in the Special PID type group, renaming the reserved PID value as the EXT (extension) PID. The EXT PID, or protocol extension token, is used for effecting an extended token phase to extend the USB transaction protocol. As shown in FIG. 4, the token phase for an extended transaction usually comprises two token packets, each a standard 3-byte token packet.

The first packet of an extension transaction is a standard token packet that includes the ADDR, ENDP, CRC5, and PID fields, with the value of the PID field corresponding to EXT (i.e. 4'b0). The EXT value of the PID filed indicates that the next, that is, second packet (with standard, back-to-back inter-packet timing) is an extended token packet (ETP). The basic structure of the ETP is identical to a standard token packet, including a first field that is a PID (SubPID) field, and the last field of the packet being a CRC5 field used to check the 11 bits between the SubPID field and the CRC5 field. The format of the Variable field in the ETP depends on the value of the SubPID field. As with existing token packets, the value of the SubPID field may indicate the direction and format of the remainder of the transaction, allowing definition of transactions with data phases with inbound or outbound data, and inclusion or omission of a handshake phase. Thus, an extended transaction may effectively have 6 bytes of token information. A value of 4'b0011 for the SubPID field is defined as the LPM token, indicating an LPM extended transaction format in the Variable field of the ETP.

The ULPI specification defines a Transmit Command (Tx Cmd) byte that is sent by the USB Link over the ULPI bus, and a Receive Command (Rx Cmd) byte that is sent by the PHY. The Link initiates transfers to the PHY by sending over the ULPI bus the Tx Cmd byte, which consists of a 2-bit command code (bits [7:6]) and a 6-bit payload (bits [5:0]). When the Tx Cmd byte is indicative of a No PID transmission, the PHY typically begins transmission on the USB starting with the subsequent data byte. The transmit command code is defined as 2'b01, and a "No PID" payload is defined as 6'b0. The No PID setting is used for transmission of USB data that does not have a PID, such as Chirp and resume signaling. Therefore, the EXT PID is not supported by ULPI PHYs since the reserved PID value of 4'b0 is used in a ULPI No PID transmission (as part of the value 6'b0), such as a Chirp transaction (as mentioned above). Therefore, there is currently no PHY support for USB 2.0 LPM using the ULPI PHY interface standard. However, a protocol may be implemented to allow ULPI Physical devices to support the USB 2.0 LPM Addendum, providing for the transmission of the reserved PID used in the LPM Extended Transaction using an existing ULPI interface.

The ULPI also defines a function control register whose function is to control the UTMI function settings of the PHY. Bits [4:3] of the function control register are configured to store an Opmode code which is used to indicate the required bit encoding style during transmission. An Opmode value of 2'b0 is indicative of normal operation, while an Opmode value of 2'b10 is indicative of bit-stuffing and NRZI encoding being disabled. In one set of embodiments, a ULPI PHY may be configured to transmit the LPM extended transaction (as described above) on the USB by using the inputs from the Opmode code portion of the function control register bits set to a value of 2'b0 indicating normal mode. The reserved PID 4'b0 may be transmitted and the remaining Extended Link transaction bytes may be encoded with the normal USB 2.0 bit-stuffing and NRZI (Non-Return to Zero Inverted) encoding. When the ULPI PHY is sending a CHIRP K transmission, or CHIRP K/J pairs, the Opmode code is typically set to 2'b10, thus indicating that bit-stuffing and NRZI encoding are turned off. The ULPI PHY will therefore not bit-stuff or NRZI encode the subsequent bytes of this ULPI transaction.

In one set of embodiments, bits [3:0] of the Tx Cmd (Transmit Command) byte may be reused, when the value of those bits is 4'b0000 during a transmission (bits[7:6]=2'b01, the combination of bits indicating a No PID transmission), by configuring the ULPI PHY to qualify the selected 4 Tx Cmd bits (bits [3:0] of the Tx Cmd) with the Opmode code. Qualifying the selected 4 Tx Cmd bits in this sense means that the ULPI PHY may determine how to interpret bits [3:0] of the Tx Cmd byte received from the USB Link based on the value of the Opmode. The ULPI PHY may be configured to not expect and/or transmit an Extended PID when the Opmode is set to 2'b10, that is, when the Opmode is indicative of bit-stuffing and NRZI encoding being disabled, for example during a Chirp transmission. When the Opmode code is set to 2'b0, indicative of normal bit-stuffing, and the Tx Cmd bits [3:0] are set to 4'b0 during a transmission (Tx Cmd bits[7:6] =2'b01), then the Extended PID may be transmitted followed by the rest of the extended transaction.

Figure 5:
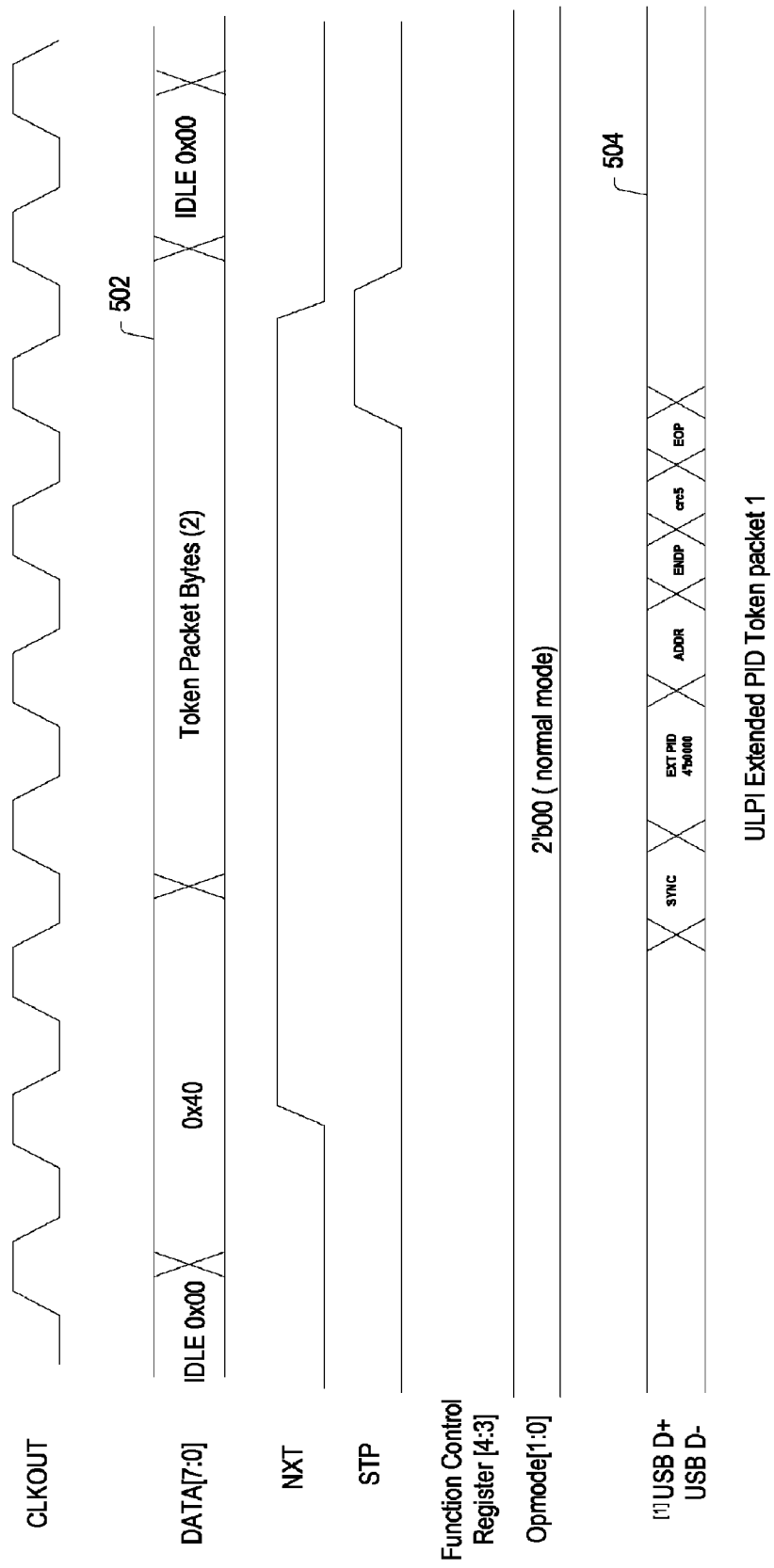
FIG. 5 illustrates a ULPI Link transmitting an Extended PID Token packet using an existing ULPI interface according to one embodiment of the present invention.

FIG. 5 shows a packet/timing diagram of a ULPI Link transmitting the extended transaction, which may then be transmitted onto a USB by a ULPI PHY, the packet illustrated in FIG. 5 as Extended PID Token packet 1. As seen in FIG. 5, when the Opmode code, comprising bits [4:3] of the internal ULPI function control register, has a value of 2'b0 (indicating normal mode), and a USB Link transmits a Tx Cmd having a value of 4'b0, followed by and Extended Token Packet, as indicated in waveform 502, a ULPI PHY may transmit the entire extended transaction onto a USB. As indicated on the D+/D− lines 504, the Extended Transaction may begin with the EXT PID (4'b0), and may be composed of two token packets. A first token packet may begin with the reserved PID, and a second token packet may begin with a "SubPID", as described above with regards to the LPM extended transaction. Under this configuration, none of the tokens involved in the transaction would conflict with ULPI functionality. Should the second token packet's SubPID use the reserved PID as a SubPID, this method may allow this SubPID to be transmitted as well.

Figure 6:
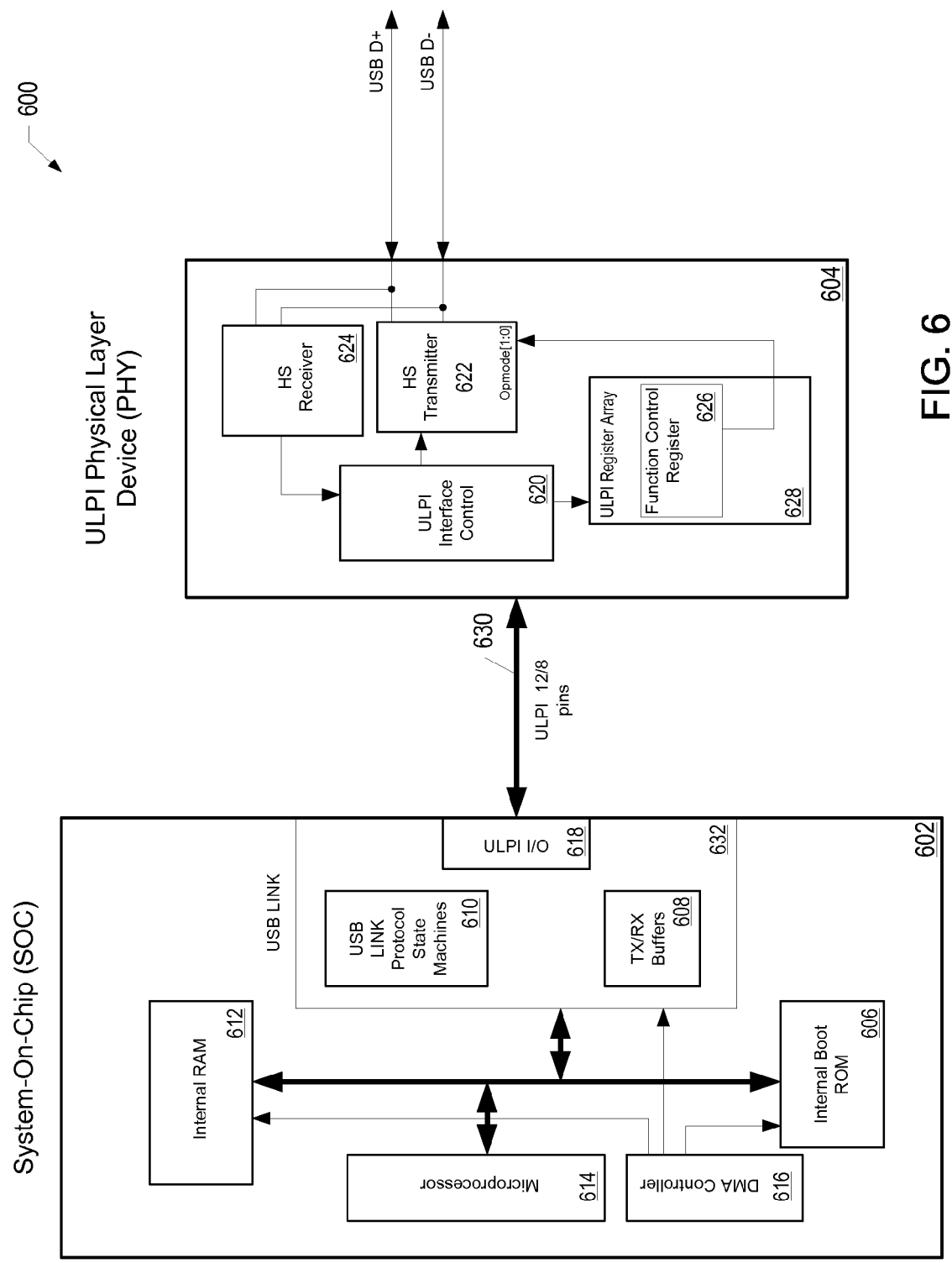
FIG. 6 shows a block diagram representative of one embodiment of a USB system that includes a USB Link and ULPI Physical Layer device (ULPI PHY) implementing USB 2.0 Link Power Management using a ULPI PHY standard.

FIG. 6 shows a block diagram representative of one embodiment of a USB system 600 that implements USB 2.0 LPM. A System-On-Chip (SOC) 602 may comprise a USB Link block 632, which may be configured to support HS/FS/LS (high-speed/full-speed/low-speed) operation as an "embedded host" in a system. Systems that may be configured with USB Link block 632 and/or SOC 602 may include host device 140 of FIG. 1, computer 240 of FIG. 2 and/or USB hub 120, just as a few examples. Other systems incorporating USB functionality are possible and are contemplated, though not explicitly disclosed herein. SOC 602 may comprise a programmable processing unit/microprocessor 614, which may be configured to execute a firmware program that may be stored, for example, in internal boot ROM 606. Internal RAM 612 may be configured to operate as a buffer for any packets sent and/or received by USB Link 632.

In one embodiment, USB Link 632 comprises internal transmit/receive (TX/RX) buffers 608 to buffer transmit and/or receive packets. In some preferred embodiments, buffers 608 may be RAM buffers. Buffers 608 may be controlled by protocol state machine 610 configured within USB Link 632. State machine 610 may comprise one or more USB Link protocol state machines configured to provide link protocol control for transferring data through ULPI I/O interface 618. In one set of embodiments, state machines 610 may be implemented from logic gates and state elements, and may not be re-programmable, unlike processing unit/microprocessor 614. A DMA controller 616 configured in SOC 602 may operate to transmit/move the contents of buffers 608 into and out of USB link 632. The contents of buffers 608 may represent the packets to be sent and/or received via ULPI I/O interface 618.

State machines 610 may be configured to enable USB Link 602 to transmit an Extended PID token followed by the remainder of the token packet in a manner similar or identical to the manner in which it transmits a normal USB token packet. In other words, state machines 610 may be configured to transmit the reserved PID used in the LPM Extended Transaction, when ULPI I/O interface 618 is a standard ULPI interface. As shown in FIG. 6, SOC 602 may be coupled to ULPI PHY (Physical Layer Device) 604 via a 12-signal or 8-signal standard ULPI bus 630, through ULPI I/O interface 618. USB PHY 604 may be external or internal to SOC 602.

In some embodiments, physical layer device 604 may be configured within SOC 602, ULPI bus 630 coupling USB link 632 to ULPI PHY 604. In other embodiments, ULPI PHY 604 may be external to SOC 602, configured on a separate integrated circuit, for example, and ULPI bus 630 may again couple USB link 632 to ULPI PHY 604. In either case, the ULPI interface standard may be used.

ULPI PHY 604 may be configured with an array of registers, such as register array 628, configured to store information about the modes in which USB PHY 604 may operate. ULPI register array 628 may include a function control register 626, with bits [4:3] of function control register 626 constituting the Opmode[1:0]. As previously described, the Opmode[1:0] may determine the bit-stuffing and NRZI coding function of ULPI PHY 604. ULPI PHY 604 may further include a high-speed (HS) receiver block 624 and an HS transmitter block 622 configured to receive and transmit packets over USB D+/D− lines, and may also include a ULPI interface control block configured to receive and transmit packets over ULPI bus 630 from SOC 602. ULPI PHY may be configured to determine what action to take on the USB D+/D− lines as a function of the contents of the internal registers in register array 628 (including function control register 626), and the input received from USB Link 632 over ULPI bus 630. Thus, USB Link 632 may be configured to transmit an extended PID token (as shown in FIG. 5, using signals CLKOUT, DATA[7:0], NXT, and STP), which ULPI PHY 604 may qualify with a value of 2'b0 of the Opmode, to transmit the ULPI Extended PID token over the USB D+/D− lines (as shown in FIG. 5, waveform 504). Overall, USB system 600 may be included in a USB Host device, a USB on-the-go (OTG) device, a USB hub and/or a computer system (such as those shown in FIGS. 1-3), and/or in an HSIC (High-Speed Interchip USB) interface, and in general any system that uses a ULPI interface.

It should be noted that alternative implementations may similarly recognize other function control register values or other existing values and/or signals (similar to the Opmode code) that may be used to qualify other selected signals or portions of packets (such as bits[3:0] of the Tx Cmd) to permit transmission of the extended transaction without conflicting with ULPI functionality, thereby implementing the LPM Addendum using an existing ULPI interface. The embodiments implemented using the registers and packets shown in the description and figures are provided as examples and are not meant to limit the scope of other possible embodiments to those explicitly disclosed.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

We claim:

1. A system comprising:
 a first bus;
 a second bus;
 a transceiver coupled to the first bus; and
 a device coupled to the first bus and the second bus;
 wherein the transceiver is configured to initiate a data transfer to the device by transmitting onto the first bus a first code indicative of a data transmission and further indicative of data to be transmitted not having a physical interface device (PID) code;
 wherein the transceiver is further configured to transmit onto the first bus, as part of the data transfer, a reserved PID code and corresponding one or more packets subsequent to transmitting the first code; and
 wherein the device is configured to receive the first code and the reserved PID code and corresponding one or more packets, wherein the device is further configured to qualify the first code with a function control code, and when the function control code is indicative of normal operation, transmit the reserved PID code and corresponding one or more packets onto the second bus.

2. The system of claim 1, wherein the reserved PID code is an extended PID token of a Link Power Management (LPM) Extension Token Transaction, and the corresponding one or more packets comprise ULPI (Universal Serial Bus Transceiver Macrocell Low-Pin Interface) extended transaction packets.

3. The system of claim 1 wherein the second bus is a USB (Universal Serial Bus), and the first bus is a standard ULPI (USB Transceiver Macrocell Low-Pin Interface) bus.

4. The system of claim 1, wherein the transceiver is a USB (Universal Serial Bus) Link, and the device is a ULPI PHY (USB Transceiver Macrocell Low-Pin Interface Physical Layer Device).

5. The system of claim 1, wherein the first code is comprised in a ULPI (USB Transceiver Macrocell Low-Pin Interface) transmit command byte.

6. The system of claim 5, wherein the value of the ULPI transmit command byte is 8'b01000000.

7. The system of claim 1, wherein the function control code is a ULPI (USB Transceiver Macrocell Low-Pin Interface) operation mode (OpMode) code.

8. A USB (Universal Serial Bus) Link comprising:
 a ULPI I/O (USB Transceiver Macrocell Low-Pin Interface Input/Output) interface configured to enable the USB Link to transmit and/or receive information over a ULPI bus; and
 USB Link protocol logic configured to:
  enable the USB Link to initiate data transfer on the ULPI bus by transmitting through the ULPI I/O interface a first code indicative of a data transmission and further indicative of data to be transmitted not having a physical interface device (PID) code; and
  enable the USB Link to transmit onto the ULPI bus through the ULPI I/O interface, as part of the initiated data transfer, a reserved PID code and corresponding one or more packets subsequent to transmitting the first code;
 wherein the reserved PID code is indicative of a request for a target device of the initiated data transfer to transition to a different state.

9. The USB Link of claim 8, further comprising one or more buffers configured to store information outgoing and incoming through the ULPI I/O interface.

10. The USB Link of claim 8, wherein the information transmitted and/or received by the USB Link over the ULPI bus comprises data packets of USB transactions.

11. A ULPI PHY (Universal Serial Bus Transceiver Macrocell Low-Pin Interface Physical Layer Device) comprising:

ULPI interface control logic configured to enable the ULPI PHY to transmit and/or receive information over a ULPI bus; and a function control register configured to store information indicative of the modes of operation of the USB PHY;

wherein the ULPI PHY is configured to receive over the ULPI interface:

a first code indicative of a data transmission and further indicative of data to be transmitted not having a physical interface device (PID) code; and a reserved PID code and corresponding one or more packets subsequent to receiving the first code;

wherein the ULPI PHY is further configured to transmit the reserved PID code and corresponding one or more packets onto a USB, when contents of the function control register are indicative of normal mode of operation.

12. The ULPI PHY of claim 11, further comprising transceiver logic configured to interface with the USB and to at least partially manage transmitting and receiving packets of the USB PHY over the USB.

13. A method for transmitting an extended transaction, the method comprising:

initiating a data transfer, comprising transmitting onto a first bus a first code indicative of a data transmission and further indicative of data to be transmitted not having a physical interface device (PID) code;

transmitting onto the first bus, as part of the data transfer, a reserved PID code and corresponding one or more packets, subsequent to said transmitting the first code;

receiving the first code and the reserved PID code and corresponding one or more packets;

qualifying the first code with a function control code; and when the function control code is indicative of normal operation, transmitting the reserved PID code and corresponding one or more packets onto a second bus.

14. The method of claim 13, wherein said transmitting the first code comprises transmitting a ULPI (Universal Serial Bus Transceiver Macrocell Low-Pin Interface) transmit command byte indicative of a No PID data transmission.

15. The method of claim 13, wherein said transmitting onto the first bus the reserved PID code comprises transmitting an LPM (Link Power Management) Extended PID token, and wherein said transmitting the corresponding one or more packets comprises transmitting at least an LPM token packet and extended token packet.

16. The method of claim 13, wherein said transmitting the reserved PID code and corresponding one or more packets onto the second bus comprises a ULPI PHY (Universal Serial Bus Transceiver Macrocell Low-Pin Interface Physical Layer Device) transmitting an LPM token packet and extended token packet onto a USB.

17. A system comprising:

a USB (Universal Serial Bus) Link configured to:

initiate data transfer on a ULPI (USB Transceiver Macrocell Low-Pin Interface) bus by transmitting a first code indicative of a data transmission and further indicative of data to be transmitted not having a physical interface device (PID) code; and transmit onto the ULPI bus, as part of the data transfer, a reserved PID code and corresponding one or more packets subsequent to transmitting the first code; and a ULPI PHY (ULPI Physical Layer Device) configured to:

store a function control code;

receive the first code;

receive the reserved PID code and corresponding one or more packets subsequent to receiving the first code; and transmit the reserved PID code and corresponding one or more packets onto a USB, when the control function code is indicative of a normal mode of operation.

18. The system of claim 17, wherein the USB Link is comprised on a system-on-chip (SOC).

19. The system of claim 18, wherein the ULPI PHY is configured on the SOC.

20. The system of claim 17, wherein the USB Link and ULPI PHY are comprised in one or more of:

a USB Host device;

a USB on-the-go (OTG) device;

a USB hub;

a computer system;

an HSIC (High-Speed Interchip USB) interface; and a system using a ULPI interface.

21. The system of claim 17, wherein the reserved PID code is indicative of a request for a target device of the initiated data transfer to transition to a different state.

\* \* \* \* \*